United States Patent [19]

Hauser et al.

[11] Patent Number: 4,671,680
[45] Date of Patent: Jun. 9, 1987

[54] BEARING JOURNAL

[75] Inventors: Hans Hauser, Chippewa Lake, Ohio; Stanley Sowa, Chicago, Ill.

[73] Assignee: MTD Products Inc., Cleveland, Ohio

[21] Appl. No.: 783,318

[22] Filed: Oct. 2, 1985

Related U.S. Application Data

[63] Continuation of Ser. No. 507,278, Jun. 23, 1983, abandoned.

[51] Int. Cl.⁴ .................... F16C 35/00; F16C 43/00
[52] U.S. Cl. ................................. 384/428; 384/537; 384/585; 29/149.5 R
[58] Field of Search ............ 384/428, 434, 438, 439, 384/537, 510, 585, 559, 560; 29/148.4 R, 148.4 A, 149.5 R; 403/284, 344

[56] References Cited

U.S. PATENT DOCUMENTS

| 345,232 | 7/1886 | Harrison | 308/53 |
|---|---|---|---|
| 2,779,641 | 1/1957 | Sutowski | 384/502 |
| 3,052,956 | 9/1962 | Daugherty | 384/537 X |
| 3,197,243 | 7/1965 | Brenneke | 403/372 |
| 3,684,324 | 8/1972 | Sterner | 384/428 |
| 3,920,342 | 11/1975 | Warda | 403/352 |
| 3,935,631 | 2/1976 | Doerner | 29/432.1 |
| 4,120,083 | 10/1978 | Echols | 29/458 |
| 4,142,618 | 3/1979 | Fontaine et al. | 384/535 |

FOREIGN PATENT DOCUMENTS

| 1372802 | 8/1964 | France | 384/585 |
|---|---|---|---|
| 168666 | 9/1921 | United Kingdom | 384/585 |

Primary Examiner—Stuart S. Levy
Assistant Examiner—David Werner
Attorney, Agent, or Firm—Woodling, Krost & Rust

[57] ABSTRACT

The disclosure relates to a bearing journal in die cast parts such as housings, to receive and hold bearings which in turn receive rotating shafts. The bearing journal comprises a plurality of axially extending and circumferentially spaced ridges or serrations and a plurality of circumferentially extending and axially spaced ridges or serrations. These serrations are readily "coined" or distorted to form an accurate bearing journal and to accommodate for inaccuracies in the journal diameters and in center to center distances between journals.

46 Claims, 9 Drawing Figures

BEARING JOURNAL

This is a continuation of co-pending application Ser. No. 507,278 filed on June 23, 1983 now abandoned.

The present invention relates to bearing journals or support surfaces for holding bearings particularly in die cast parts.

In die casting transmission housings and like structures for products such as garden tractors and lawn mowers, it is conventional to form bearing journals for the structure in the form of the surface of the cylinder. The completed journal is comprised of half cylindrical surfaces produced in two mating parts which are adapted to be secured together by appropriate means.

The die casting of this type bearing journal to size from materials such as aluminum, brass and the like is costly and difficult to accomplish with any desired degree of accuracy. The dimensional inaccuracies in the finished parts result primarily from shrinkage variations in the metals being cast and die temperature variations in the die casting machines. In view of the fact that the bearing journals are formed as cylindrical surfaces, they cannot be easily coined (i.e., movement of metal of the surface to accommodate tolerance variations) without fracturing the housing part on which they are formed.

Slight imperfections resulting from these problems result in rather dramatic effects on the bearings which are held in the journals which result in adverse effects on shafts carried by the bearings. Locking and binding of shafts in the bearings are common problems.

The present invention addresses these problems and solves them by means of a plurality of axially extending and circumferentially spaced serrations or ridges and a plurality of circumferentially extending and axially spaced serrations or ridges which can be easily "coined" (i.e., metal moved) to form a circular or cylindrical shape to a proper dimension. By the same procedure, the correct "center" dimensions between two or more bearing journals can be accomplished.

The axially extending ridges or serrations tend to engage the bearing to prevent the bearing from rotating in its journal and the circumferentially extending ridges or serrations tend to grip the bearing in a fashion to keep the bearing round rather than tending to make the bearing oblong or "squarish" in shape.

Other advantages and a fuller understanding of the invention may be had by referring to the following description and claims, taken in conjunction with the accompanying drawings, in which:

FIGURES OF THE DRAWINGS

DESCRIPTION OF THE INVENTION HEREIN DISCLOSED

Figure 2:
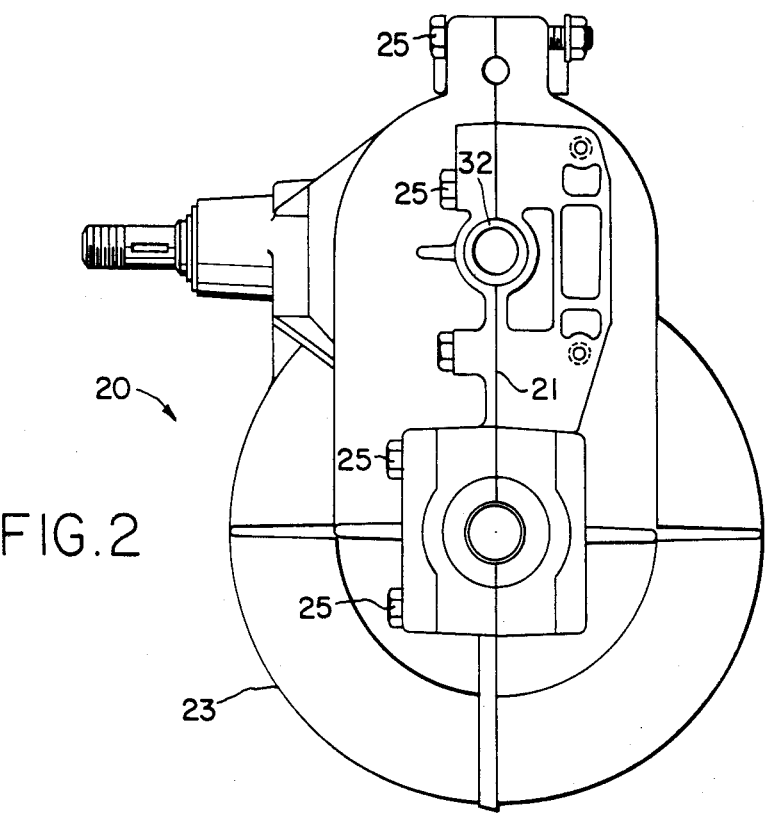
FIG. 2 is an end view of the transmission housing formed by two assembled die cast halves and taken from the right end of FIG. 1.

The present invention is illustrated in its preferred form herein in a die cast aluminum transmission housing 20 for use in a garden tractor. The housing 20 is made up of two halves 22 and 23 held together at a parting line 21 by bolts 25 as best seen in FIG. 2. The halves 22 and 23 are somewhat dissimilar in their overall configuration, however, they are identical in respect to the bearing journal which is disclosed herein, and the subject of the present invention. The half 22 of the housing is described and shown in detail herein and shows journals identified by the reference numerals 26-31. Journal 26 is illustrated with a bearing 32 in place, however, it is constructed similar to journal 27. It will be understood that each identified structure in part 22 is only one half of a complete journal with the other one half found in transmission half 23.

Figure 1:
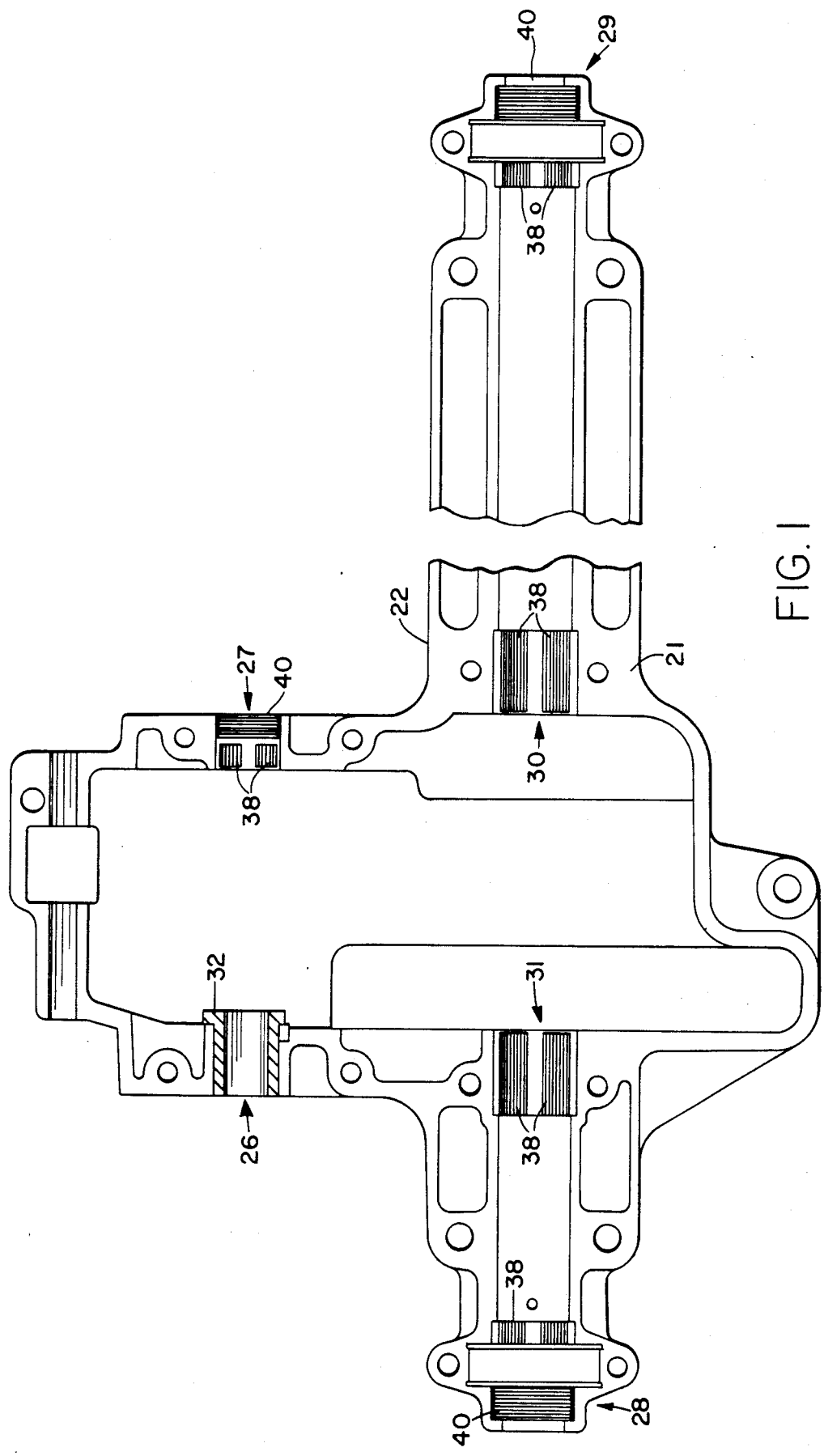
FIG. 1 is a plan view of one half of an aluminum die cast transmission housing incorporating the bearing journal structure of the present invention.
Figure 3:
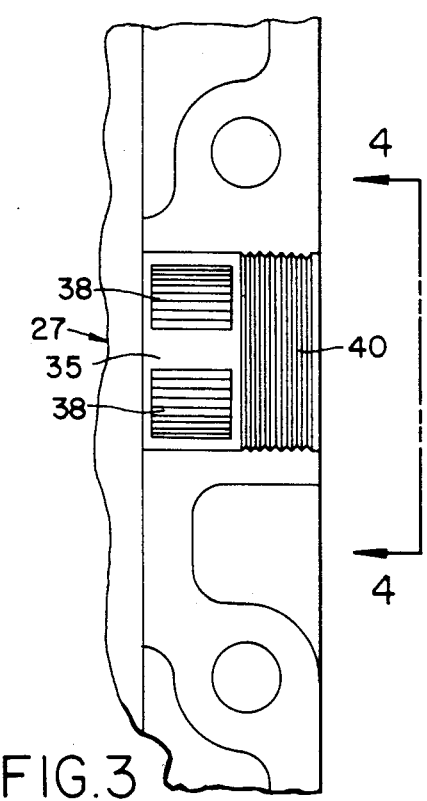
FIG. 3 is an enlarged fragmentary view of one of the bearing journal structures shown in FIG. 1.
Figure 4:
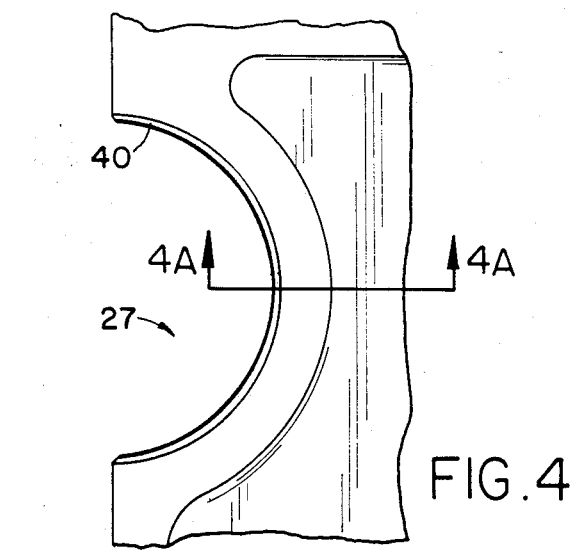
FIG. 4 is a view taken generally along the line 4—4 of FIG. 3.
Figure 4A:
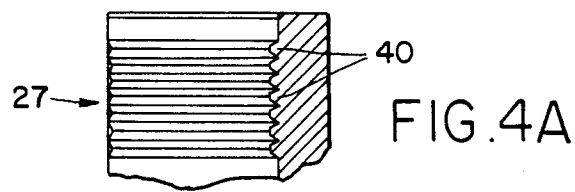
FIG. 4A is a view taken generally along the line 4A—4A of FIG. 4.
Figure 5:
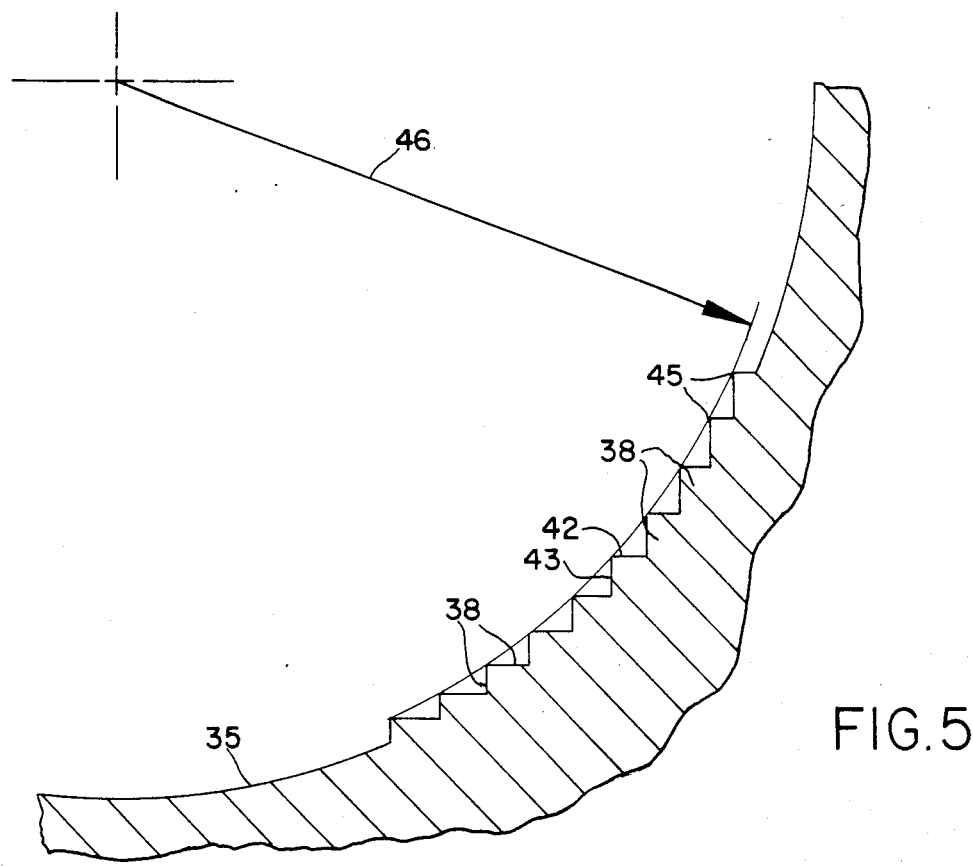
FIG. 5 is an enlarged fragmentary view showing a cross section of the axially extending serrations of the bearing journal.

Journal 27 is shown enlarged in FIGS. 3-5 and includes a cylindrical surface 35 of a first radius upon which is formed in the die casting operation a first plurality of axially extending and circumferentially spaced ridges or serrations 38 each of which is generally triangular in shape when viewed in cross section (FIG. 5). The surface 35 also includes a second plurality of circumferentially extending and axially spaced ridges or serrations 40 each of which is generally triangular in shape when viewed in cross section (FIG. 4A). As seen in FIG. 1, these first and second plurality of ridges are axially spaced from each other.

The first plurality 38 of ridges are preferably positioned or formed in four (4) groups about the 360 degree extent of each journal with each group extending on the order of 20-25 degrees. The ridges of the first plurality 38 have two sides 42 and 43 (see FIG. 5) with the first side 42 extending generally parallel to the parting line 21 and the second side 43 extending generally perpendicular to the parting line. Side 43 does extend at a small angle (for example 1 degree) to the perpendicular to provide for clean removal from the die casting mold. As shown in FIGS. 4A and 5 both the ridges 40 and the ridges 38 have sides open to or facing the parting line 21 for clean removal from the die cast mold.

As the parts 22 and 23 come from the die casting machine, flash is present on the perimeter of the parts, which must be removed. In addition, the crests 45 of the serrations are, for example, of a radius 46 which is not the correct radius to receive a bearing to be held therein in a finished housing. In addition, the center to center distances between journals 26-31 may not be within acceptable tolerances. These last mentioned problems arise usually because of shrinkage variations in the metal being used and temperature variations in the die casting machine.

Figure 8:
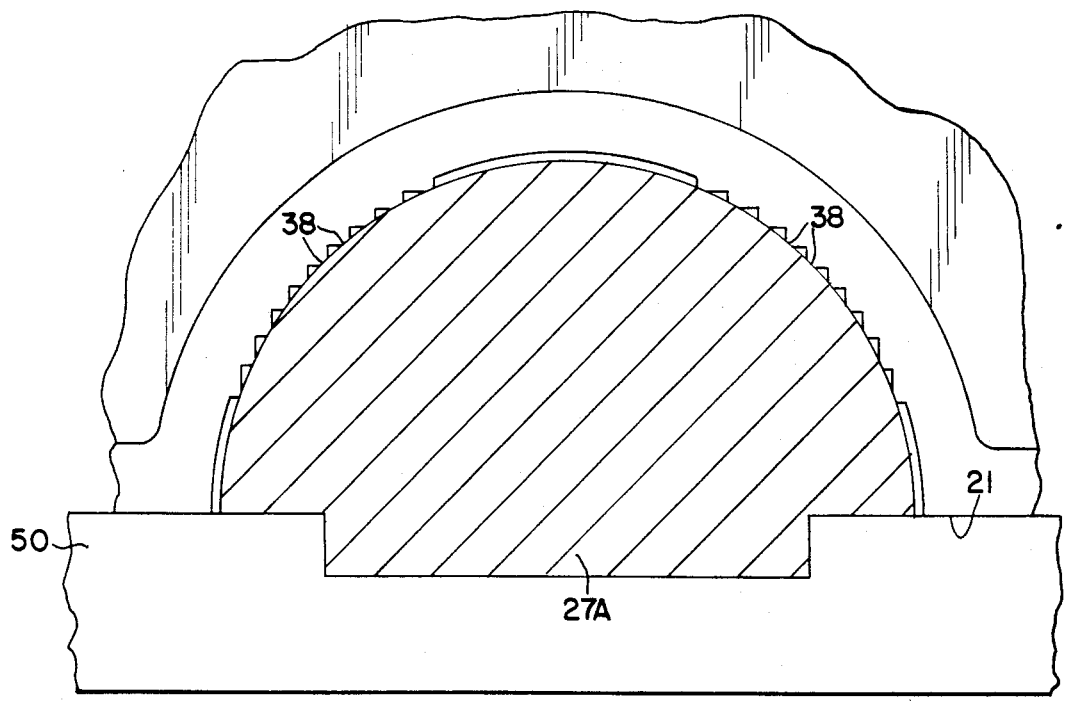
FIG. 8 is an enlarged view of a portion of FIG. 7 illustrating the forming or shaping of the axially extending serrations to an accurate diameter.
Figure 6:
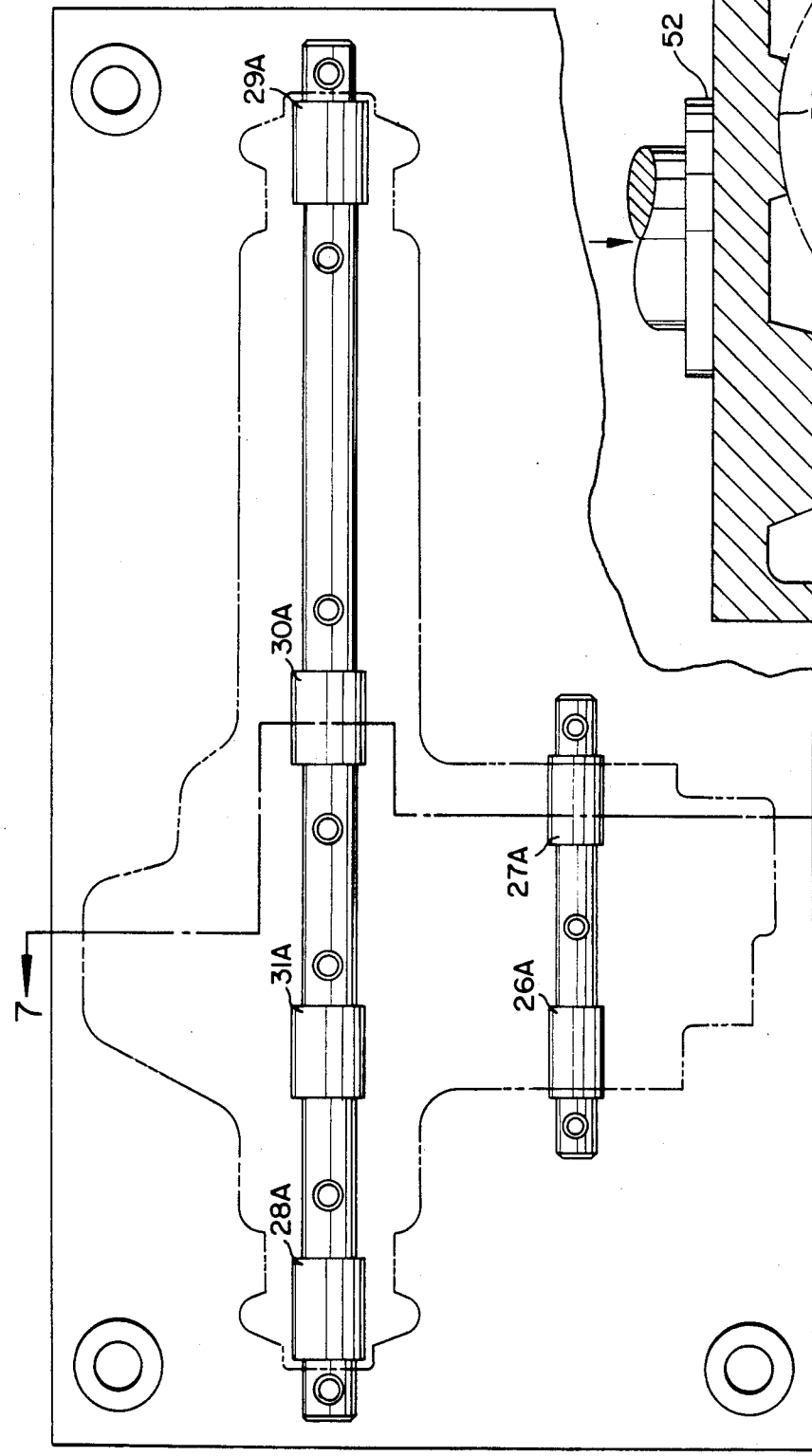
FIG. 6 is a plan view of a simplified trimming and forming mechanism for accurately shaping and locating the bearing journals as well as removing flash from the perimeter of the die cast part.
Figure 7:
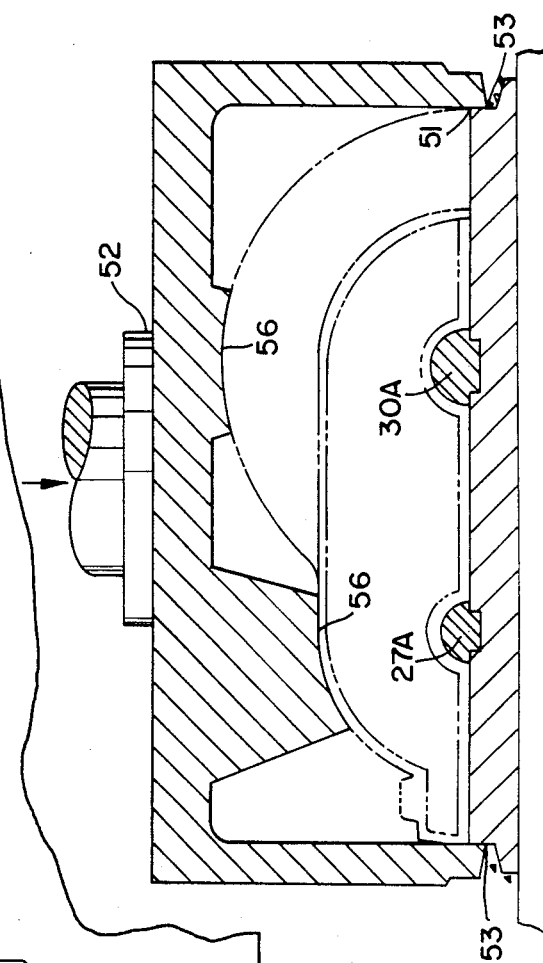
FIG. 7 is a view taken generally along the line 7—7 of FIG. 6.

The parts 22 and 23 as they come from the die casting machine are processed in the equipment of FIGS. 6-8. This equipment includes a trim die structure and comprises a fixed base 50 which has secured thereto a plurality of cylindrical forming members 26A–31A which are very accurately constructed with respect to their radii and their center to center distances. These members are designed to correspond to journals 26–31 respectively. A vertically movable member 52 having a cutting edge 53 of a contour to conform to the perimeter of the finished part 22 is provided and edge 53 cooperates with an edge 51 on the base to remove flash from the part. In addition, pad areas 56 are provided on member 52 to engage the housing in the areas immediately above the forming members 26A–31A to engage these members with the journals 26–31 in the housing part to form or coin the ridges or serrations 38 and 40 to the radius of members 26A–31A and to adjust inaccuracies in the desired center distances between journals 26–31.

FIG. 8 illustrates the forming or coining of the apex or crests 45 of the first plurality of ridges or serrations in journal 27 to confrom to the desired journal radius in the finished part which in this illustration is slightly larger than the radius 46. It may be said that the crests 45 are flattened. The structure of the ridges or serrations provides a convenient structure for the reception of metal in the coining process without exerting undue force on the housing part tending to rupture or fracture the same. The structure of the present invention is adapted to accommodate and provide for diametrical and center to center distance inaccuracies of on the order of from 0.001 to 0.005 inch. It will be understood by those skilled in the art that the finished transmission includes bearings in all the journals 26–31 which rotatably mount shafts which in turn cooperate with appropriate gearing. Since this structure forms no part of the invention, it has not been illustrated.

The first and second plurality of serrations or ridges which are included in the bearing journals uniquely cooperate with the bearings received therein. The axially extending serrations provide a structure that holds the bearing from rotation and the circumferentially extending serrations provide a good seal against the escape of lubricant axially along the outer surface of the bearing and also tend to prevent the bearing from assuming an "out of round" or "oval" shape because of forces acting on it.

Although this invention has been described in its preferred form with a certain degree of particularity, it is to be understood that numerous changes may be made without departing from the invention as hereinafter claimed.

What is claimed is:

1. In a generally cylindrically shaped cavity having two semi-cylindrical supporting surfaces joining at a plane for receiving and holding a generally cylindrical shaped member therebetween, an improvement comprising each surface of the cylindrical shaped cavity having ridges, said ridges having faces, substantially all of said faces extending generally facing the plane joining the semi-cylindrical supporting surfaces, said ridges being deformable to conform to the shape of the generally cylindrical shaped member and thus provide full support for same.

2. The improved surface of claim 1 characterized in that said ridges are generally triangular in cross section.

3. The improved surface of claim 1 characterized in that said ridges extend generally axially of the cavity.

4. The improved surface of claim 3 characterized by the addition of a second set of ridges, said second set of ridges being deformable and said second set of ridges extending circumferentially of the cavity.

5. The improved cavity of claim 1 wherein the cylindrically shaped cavity is one of two cavities, each cavity having a center, and characterized in that the deforming of the ridges adjusts the center to center distance between the cavities.

6. The improved cavity of claim 5 wherein the center to center distance between the cavities has a desired value and characterized in that the center to center distance is adjusted to this desired value.

7. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a plurality of axially extending and circumferentially spaced ridges each of which is generally triangular in shape when viewed in cross section, one side of said triangular shape of said plurality of ridges extending generally parallel to said mating surfaces and another side of said triangular shape of said plurality of ridges extending at a small angle to a plane extending normal to said mating surfaces and said plurality of ridges forming substantially all of the support surface for the bearing.

8. A bearing supporting surface as claimed in claim 7 wherein said first plurality of axially extending and circumferentially spaced ridges are arranged in groups which groups are circumferentially spaced from each other.

9. A bearing supporting surface as claimed in claim 7 wherein the apex of said triangular shape of at least some of said first plurality of ridges is flattened to accommodate the diameter of the bearing member it is to receive.

10. A bearing supporting surface as claimed in claim 8 wherein there are four groups within the 360 degree extent of said bearing supporting surface and each group extends about 20–25 degrees and each group is equally spaced from the other.

11. The improved cylindrical shaped bearing supporting surface of claim 7 wherein the cylindrical shaped bearing supporting surface is one of two cylindrical shaped surfaces, each surface having a central axis, and characterized in that said plurality of ridges are deformable to adjust the distance center to center between the central axes of the cylindrical shaped surfaces.

12. The improved cylindrical shaped surface of claim 11 wherein the center to center distance between the central axes of the cylindrical shaped surfaces has a desired value and characterized in that this center to center distance is adjusted to this desired value.

13. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a plurality of axially extending and circumferentially spaced ridges each of which is generally triangular in shape when viewed in cross section, one side of said triangular shape of said plurality of ridges extending generally parallel to said mating surfaces and another side of said triangular shape of said plurality of ridges extending at a small angle to a plane extending normal to said mating surfaces, said plurality of ridges being deformable to conform to the shape of generally cylindrical bearing member and said plurality of ridges forming substantially all of the support surface for the generally cylindrical bearing member.

14. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a first plurality of axially extending and circumferentially spaced ridges each of which is generally triangular in shape when viewed in cross section, one side of said triangular shape of said first plurality of ridges extending generally parallel to said mating surfaces, another side of said triangular shape of said first plurality of ridges extending at a small angle to a plane extending normal to said mating surfaces, a second plurality of circumferentially extending and axially spaced ridges each of which is generally triangular in shape when viewed in cross section, and said first and second plurality of ridges being axially spaced from each other.

15. A bearing supporting surface as claimed in claim 14 wherein said first plurality of axially extending and circumferentially spaced ridges are arranged in groups which groups are circumferentially spaced from each other.

16. A bearing supporting surface as claimed in claim 14 wherein the apex of said triangular shape of at least some of said first plurality of ridges is flattened to accommodate the diameter of the bearing member it is to receive.

17. A bearing supporting surface as claimed in claim 15 wherein there are four groups within the 360 degree extent of said bearing supporting surface and each group extends about 20-25 degrees and each group is equally spaced from the other.

18. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a first plurality of axially extending and circumferentially spaced ridges, and a second plurality of circumferentially extending and axially spaced ridges, said first and second plurality of ridges being axially spaced from each other.

19. A bearing supporting surface as claimed in claim 18 wherein said first plurality of axially extending and circumferentially spaced ridges are arranged in groups which groups are circumferentially spaced from each other.

20. A cylindrically shaped bearing supporting surface as claimed in claim 18 wherein said ridges of said first and second plurality are generally triangular in shape when viewed in cross section.

21. A bearing supporting surface as claimed in claim 20 wherein the apex of said triangular shape of at least some of said first and second plurality of ridges is flattened to accommodate the diameter of the bearing member it is to receive.

22. A bearing supporting surface as claimed in claim 19 wherein there are four groups within the 360 degree extent of said bearing supporting surface and each group extends about 20-25 degrees and each group is equally spaced from the other.

23. The improved cylindrical shaped bearing supporting surface of claim 18 wherein the cylindrical shaped bearing supporting surface is one of two cylindrical shaped surfaces, each surface having a central axis, and characterized in that said first plurality and said second plurality of ridges are deformable to adjust the distance center to center between the central axes of the cylindrical shaped surfaces.

24. The improved cylindrical shaped surface of claim 23 wherein the center to center distance between the central axes of the cylindrical shaped surfaces has a desired value and characterized in that this center to center distance is adjusted to this desired value.

25. A cylindrically shaped bearing supporting surface for receiving and holding a generally cylindrical bearing member, said bearing supporting surface being formed in a die cast member of aluminum, brass, bronze, or like material and including in combination first and second housing members having mating surfaces engaging each other, each of said first and second housing members having a surface comprising substantially one-half of said cylindrically shaped bearing supporting surface, said bearing supporting surface comprising a plurality of axially extending and circumferentially spaced ridges each of which is generally triangular in shape when viewed in cross section, one side of said triangular shape of said plurality of ridges extending generally parallel to said mating surfaces and another side of said triangular shape of said plurality of ridges extending at a small angle to a plane extending normal to said mating surfaces, said ridges directly contacting the bearing and forming substantially all of the support surface therefor.

26. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a plurality of axially extending and circumferentially spaced ridges each of which is generally triangular in shape when viewed in cross section, one side of said triangular shape of said plurality of ridges extending generally parallel to said mating surfaces and another side of said triangular shape of said plurality of ridges extending at a small angle to a plane extending normal to said mating surfaces, said plurality of ridges extending about substantially the entire length of said bearing support surface, and said plurality of ridges directly contacting the bearing and forming substantially all of the support surface for the bearing.

27. A cylindrically shaped bearing supporting surface for receiving and holding a generally cylindrical bearing member and including in combination first and second housing members having mating surfaces engaging each other, each of said first and second housing members having a surface comprising substantially one-half of said cylindrically shaped bearing supporting surface, said bearing supporting surface comprising a plurality of ridges each of which is generally triangular in shape when viewed in cross section, substantially all of the sides of said triangular shape of said plurality of ridges extending generally facing said mating surfaces and said plurality of ridges forming substantially all of the support surface for the bearing.

28. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a plurality of axially extending and circumferentially spaced ridges each of which is generally triangular in shape when viewed in cross section, one side of said triangular shape of said plurality of ridges extending generally facing said mating surfaces and another side of said triangular shape of said plurality of ridges extending at a small angle to a plane extending normal to said mating surfaces and said plurality of ridges forming substantially all of the support surface for the bearing.

29. A bearing supporting surface as claimed in claim 28 wherein said first plurality of axially extending and circumferentially spaced ridges are arranged in groups which groups are circumferentially spaced from each other.

30. A bearing supporting surface as claimed in claim 28 wherein the apex of said triangular shape of at least some of said first plurality of ridges is flattened to accommodate the diameter of the bearing member it is to receive.

31. The improved cylindrical shaped bearing supporting surface of claim 28 wherein the cylindrical shaped bearing supporting surface is one of two cylindrical shaped surfaces, each surface having a central axis, and characterized in that said plurality of ridges are deformable to adjust the distance center to center between the central axes of the cylindrical shaped surfaces.

32. The improved cylindrical shaped surface of claim 31 wherein the center to center distance between the central axes of the cylindrical shaped surfaces has a desired value and characterized in that this center to center distance is adjusted to this desired value.

33. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a plurality of axially extending and circumferentially spaced ridges each of which is generally triangular in shape when viewed in cross section, one side of said triangular shape of said plurality of ridges extending generally facing said mating surfaces and another side of said triangular shape of said plurality of ridges extending at a small angle to a plane extending normal to said mating surfaces, said plurality of ridges being deformable to conform to the shape of the generally cylindrical bearing member and said plurality of ridges forming substantially all of the support surface for the generally cylindrical bearing member.

34. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a first plurality of axially extending and circumferentially spaced ridges each of which is generally triangular in shape when viewed in cross section, one side of said triangular shape of said first plurality of ridges extending generally facing said mating surfaces, another side of said triangular shape of said first plurality of ridges extending at a small angle to a plane extending normal to said mating surfaces, a second plurality of circumferentially extending and axially spaced ridges each of which is generally triangular in shape when viewed in cross section, and said first and second plurality of ridges being axially spaced from each other.

35. A bearing supporting surface as claimed in claim 29 wherein there are four groups within the 360 degree extent of said bearing supporting surface and each group extends about 20-25 degrees and each group if equally spaced from the other.

36. A bearing supporting surface as claimed in claim 34 wherein said first plurality of axially extending and circumferentially spaced ridges are arranged in groups which groups are circumferentially spaced from each other.

37. A bearing supporting surface as claimed in claim 34 wherein the apex of said triangular shape of at least some of said first plurality of ridges is flattened to accommodate the diameter of the bearing member it is to receive.

38. A bearing supporting surface as claimed in claim 36 wherein there are four groups within the 360 degree extent of said bearing supporting surface and each group extends about 20-25 degrees and each group is equally spaced from the other.

39. The improved cylindrical shaped bearing supporting surface of claim 34 wherein the cylindrical shaped bearing supporting surface is one of two cylindrical shaped surfaces, each surface having a central axis, and characterized in that said first plurality and said second plurality of ridges are deformable to adjust the distance center to center between the central axes of the cylindrical shaped surfaces.

40. The improved cylindrical shaped surface of claim 39 wherein the center to center distance between the central axes of the cylindrical shaped surfaces has a desired value and characterized in that this center to center distance is adjusted to this desired value.

41. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface said bearing supporting surface comprising a plurality of circumferentially extending and axially spaced ridges each of which is generally triangular in shape when viewed in cross section, both sides of said triangular shape of said plurality of ridges extending generally facing said mating surfaces, and said plurality of ridges forming substantially all of the support surface for the bearing.

42. A bearing supporting surface as claimed in claim 41 wherein the apex of said triangular shape of at least some of said first plurality of ridges is flattened to accommodate the diameter of the bearing member it is to receive.

43. The improved cylindrical shaped bearing supporting surface of claim 41 wherein the cylindrical shaped bearing supporting surface is one of two cylindrical shaped surfaces, each surface having a central axis, and characterized in that said plurality of ridges are deformable to adjust the distance center to center between the central axes of the cylindrical shaped surfaces.

44. The improved cylindrical shaped surface of claim 43 wherein the center to center distance between the central axes of the cylindrical shaped surfaces has a desired value and characterized in that this center to center distance is adjusted to this desired value.

45. A cylindrically shaped bearing supporting surface for receiving and holding a generally cylindrical bearing member, said bearing supporting surface being formed in a die cast member of aluminum, brass, bronze or like material and including in combination first and second housing members having mating surfaces engaging each other, each of said first and second housing members having a surface comprising substantially one-half of said cylindrically shaped bearing supporting surface, said bearing supporting surface comprising a plurality of circumferentially extending and axially spaced ridges each of which is generally triangular in shape when viewed in cross section, both sides of said triangular shape of said plurality of ridges extending generally facing said mating surfaces, said plurality of ridges being deformable to conform to the shape of the generally cylindrical bearing member and said plurality of ridges forming substantially all of the support surface for the generally cylindrical bearing member.

46. A bearing supporting surface as claimed in claim 45 wherein the apex of said triangular shape of at least some of said first plurality of ridges is flattened to accommodate the diameter of the bearing member is to receive.

* * * * *